Patented Nov. 29, 1938

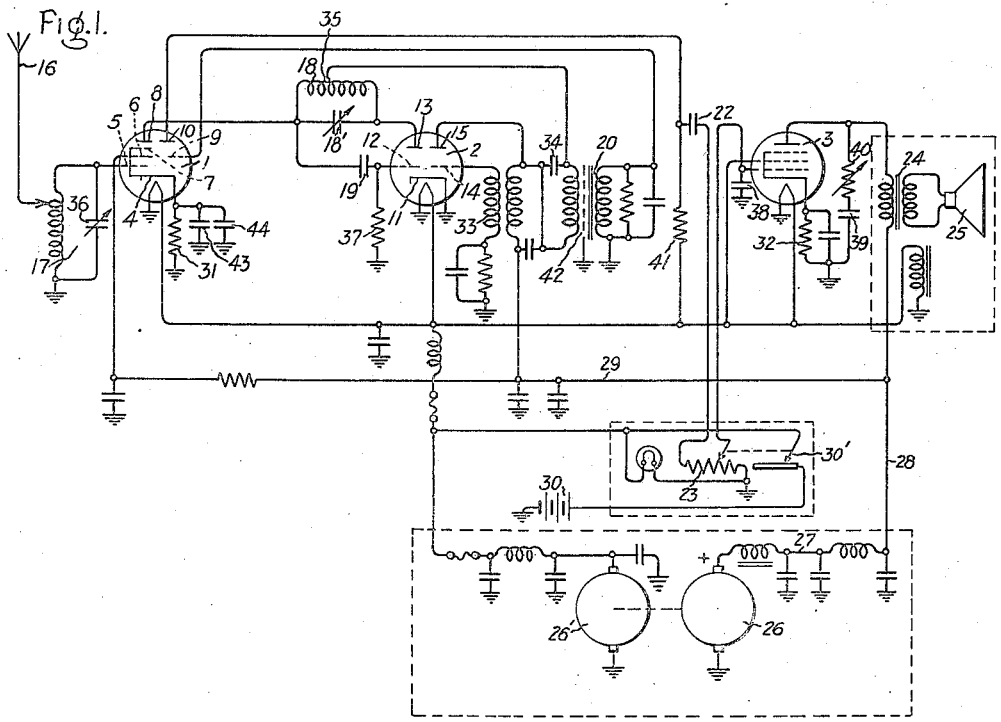
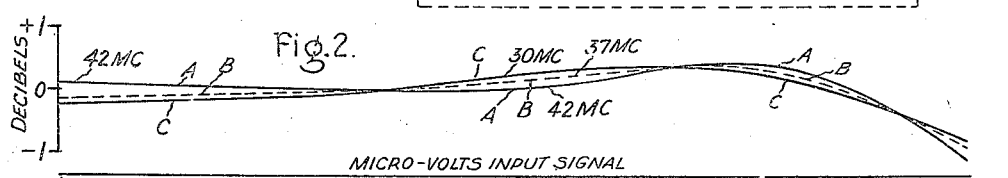
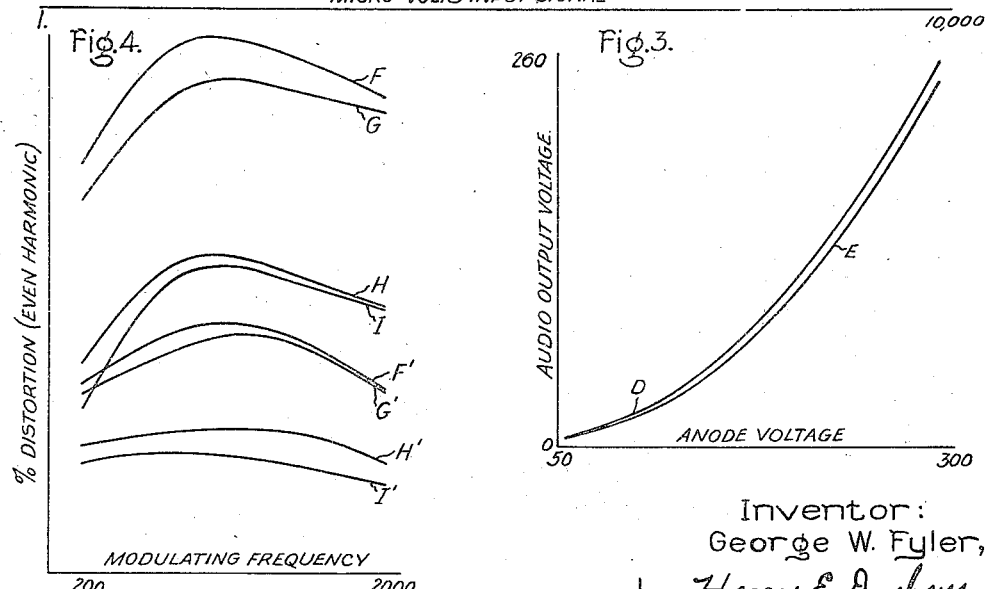
Inventor:
George W. Fyler,
by Harry E. Dunham
His Attorney.

2,138,655

UNITED STATES PATENT OFFICE 2,138,655

RECEIVING SYSTEM

George W. Fyler, Schenectady, N. Y., assignor to General Electric Company, a corporation of New York Application June 21, 1935, Serial No. 27,701

14 Claims. (Cl. 250—20)

My invention relates to super-regenerative detectors and it has for one of its objects to provide such a detector having improved characteristics whereby it is more particularly adapted for use in automobile receivers employed, for example, by municipal police.

In service, on moving vehicles, it is desirable to provide in the receiver means for maintaining the output from the receiver substantially constant notwithstanding wide variations in received signal intensity. This is particularly true when the receiver is one adapted for operation at short wavelengths, such, for example, as frequencies in the band extending from 30 to 42 megacycles which are assigned to municipal police service. Radiated energy of these frequencies is not evenly distributed over the area in which reception is desired by reason of the effects of reflections, standing waves and the like. Waves, for example, may arrive at any point over two different paths from the transmitter and substantially neutralize each other at the said point. Standing waves produced by reason of reflections from different reflecting surfaces, such as are prevalent in city districts, for example, have nodal points along the streets at which the signal intensity is very weak. In addition, certain areas about city streets are substantially shielded from the radiated energy, as for example, areas under structural steel underpasses, and the like, or behind hills. For this reason an efficient automatic volume control means adapted for operation over a wide range of signal intensities is highly important to satisfactory operation of the receiver.

In addition, it is necessary that the automatic volume control means be sufficiently rapid in its operation to maintain constant signal output from the receiver during the rapid movements of the automotive vehicle on which it is carried into and out of such areas of low signal intensity.

The super-regenerative detector has been found to produce variations in output signal intensity which are small in magnitude relative to variations in signal intensity supplied thereto. One of the objects of my invention is to provide such a detector in which the output is substantially constant over a very broad range of signal intensities.

A further object of my invention is to provide such a detector having constant output over a very broad range of signal intensities when adjusted for operation at any frequency in a wide range.

A further object of my invention is to provide a super-regenerative detector adapted for operation with constant output over a wide range of received frequencies and intensities and which may be adjusted for reception of such different frequencies with a maximum of facility.

A further problem in connection with the operation of radio receivers at frequencies such as those referred to arises from interference produced by the ignition systems of automobiles. One of the objects of my invention is to reduce this interference.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention, and Figs. 2, 3, and 4 represent certain characteristics of its operation.

Referring to the drawing, I have shown in Fig. 1 thereof a circuit arrangement comprising three electron discharge devices 1, 2, and 3. The envelope of the electron discharge device 1 encloses a cathode 4, which is common to the elements of a radio frequency amplifier comprising control grid 5, screen grid 6, suppressor grid 7, and an anode 8; and also to an audio amplifier comprising grid 9 and anode 10. The envelope of the electron discharge device 2 includes a cathode 11, which cooperates with the elements 12 and 13 of a super-regenerative detector, and also with the elements 14 and 15 of an oscillation generator, which generates the quench frequency for the super-regenerative detector. The electron discharge device 3 comprises a conventional pentode audio frequency amplifier.

The oscillations to be detected are received upon an antenna 16 and supplied to a tuned circuit 17 connected between the grid 5 and cathode 4 of the radio frequency amplifier in discharge device 1. The anode 8 of this amplifier is connected to the anode 13 of the super-regenerative detector through a tuned circuit comprising inductance 18 and a tuning condenser 18'. This anode 8 is also connected directly to the grid of the super-regenerative detector through a condenser 19. The audio output from the super-regenerative detector is supplied through an audio transformer 20 to the grid 9 of the audio amplifier which is enclosed within the envelope of the discharge device 1. The audio output from this amplifier is supplied through a coupling condenser 22 to a potentiometer 23, the variable tap of which is connected to the control grid of the audio amplifier 3. The output from this amplifier is supplied through a transformer 24 to a suitable signal device such as a loudspeaker 25.

Anode potential for operation of the different discharge devices is supplied from a source 26, which may comprise a suitable motor operated generator, through a suitable filter 27 and conductors 28 and 29, to the different anodes, the circuits in detail being obvious from the drawing. Cathode heating potential is derived from a source of potential 30 through a switch 30', this source also being employed for energization of the motor 26' which drives the generator 26. Bias potentials for operation of the discharge devices within the envelopes 1 and 3 are obtained from suitable cathode bias resistors 31 and 32 which are common to the anode and grid circuits of these devices.

The quench frequency for operation of the super-regenerative detector is produced by the oscillator comprising the cathode 11, grid 14 and anode 15, the grid and anode circuits of this device being coupled together by means of the transformer 33. The oscillations generated by this device have a frequency of about 20,000 cycles and are supplied through a condenser 34 to a tap point 35 on the inductance 18 of the above referred to tuned circuit 18, 18' and thence through opposite portions of this inductance 18 to the grid and anode of the super-regenerative detector in phase. Thus this quench frequency is supplied both to the grid and anode of the super-regenerative detector, and also since the anode 8 of the first radio frequency amplifier is connected to the left terminal of the tuned circuit 18, 18' the quench frequency is likewise supplied to this anode.

The circuit 18, 18' is adapted to be tuned over the range of frequencies to be received and for this purpose the condenser 18' is variable and may if desired be mechanically coupled for unicontrol with the tuning condenser 36 of the input to the first radio frequency amplifier.

In the operation of my device oscillations having the frequency of the received signals are produced in the circuit 18, 18' by action of the electrodes 11, 12, and 13 of the discharge device 2. It will be observed that the connection of this device is substantially that of a conventional oscillating circuit, of the so-called Hartley type. These oscillations, however, are intermittent by reason of the application of the quench voltage to the electrodes of the discharge device and occur only during a small portion of the positive half cycle of this quench voltage. Oscillations to be detected are, of course, supplied to this circuit from the anode of the first radio frequency amplifier 4—8 in the envelope 1 and are detected, the audio frequency oscillations appearing in the primary winding of the transformer 20 whereby they are amplified by the audio amplifier 4, 9, 10 of the discharge device 1, and amplifier 3, and are then supplied to the loudspeaker.

I shall not here attempt an accurate theoretical explanation of all the results secured by my invention. It has been found, however, that a super-regenerative detector constructed as thus described is tunable for operation over a wide frequency range solely by adjustment of the condenser 18'. This is of extreme importance since all of the balancing and stability adjustments which have heretofore been necessary are avoided. In addition, it has been found that a substantially constant output is obtained from the detector over a wide range of received signal intensities at all of the frequencies at which it operates. This, for example, is indicated by the curves of Fig. 2 in which curves A, B, and C represent the output from a detector constructed in accordance with Fig. 1 over a range of signal intensities extending from one microvolt to 10,000 microvolts, this input signal intensity being plotted as abscissas whereas the audio output signal is plotted as ordinates in decibels. Thus, curves A, B, and C represent respectively the operation of the device when tuned for operation at 42, 37, 30 megacycles. It will be observed that the variation in audio output signal of all these curves is less than one decibel over substantially this entire range of signal intensities at all of these frequencies. By substitution of smaller coils the range of frequencies at which these results are obtained may be extended to include sixty megacycles.

It has been found, however, that the character of these curves is largely dependent upon the position of the tap point 35 upon the inductance 18 and that variation of this point in either direction from a fixed position upon the coil very greatly alters the shape of these curves and increases the variation in signal output with variation of the signal input which may be obtained. This I attribute to an optimum ratio of voltages of the frequency at which the detector oscillates which appear upon the grid 12 and anode 13 of the detector. Any variation of this ratio materially affects the constancy of output with respect to variation in input signal intensity. My invention is not limited to the particular means described for obtaining the desired optimum ratio of grid and anode voltages on the detector since many means and circuit arrangements may be employed capable of producing this desired optimum ratio.

The constancy of output indicated in Fig. 2 which is obtainable in accordance with my invention is also accompanied by substantial absence of interference due to extraneous, damped, or transient oscillations, such, for example, as those produced by automobile ignition systems. That is, the flat character of these curves coupled with the fact that they obtain notwithstanding the rate of variation of the signal intensity operates to render the system substantially unresponsive to currents tending to produce noise in the output of the receiver.

In the arrangement shown it is desirable that the condenser 19 have an impedance which is low at the quench frequency relative to the impedance of the grid leak 37. I have found that this condenser may preferably be of about 50 micro microfarads whereas the resistance 37 may be of a value of about 2 megohms whereby substantially 80 per cent of the voltage of the quench source appears upon the grid of the detector. While the adjustment of these elements of the system may be somewhat critical, their values are less critical when the tap 35 is accurately adjusted to the point producing the desired optimum of ratio of grid and anode voltages on the detector.

It has been further found that the operation of my detector is stable over the entire range of frequencies, and is free from parasitics and the like. It is also stable notwithstanding variations in the anode voltage. This is indicated by the curves of Fig. 3 which express the relation between the output from the detector plotted as ordinates and the anode voltage applied to the detector plotted as abscissas. The curve D of this figure is taken with the system adjusted for operation at 42 megacycles and the curve E with the system adjusted for operation at 30 megacycles.

It has been found that the quality of output obtained from a detector constructed in accordance with my invention is dependent to a considerable extent upon the polarity of the secondary winding of the transformer 20. With this winding polarized in one direction it has been found that a considerable distortion occurs in the output voltage whereas this distortion is very greatly reduced by reversing the polarity of this transformer winding. The curves of Fig. 4 represent this characteristic of the device, these curves expressing the relation between the percent of distortion plotted as ordinates and the modulating frequency plotted as abscissas. Curves F, G, H, and I express this relationship with the winding reversed from its proper connection, the curves F and G corresponding to a received signal having a 60% modulation, and the curves H and I corresponding to 30% modulation. The curves G and H were taken with an input applied to the detector of 10 microvolts, whereas the curves F and I were taken with an input of 100 microvolts. The curves F', G', H', and I' of this figure show the same relationships when the transformer winding is properly polarized. It will be observed that the distortion is reduced to less than half of its original value. I attribute this result to a compensating effect of harmonic distortion in the audio amplifier 4, 9, 10 upon that produced by the super-regenerative detector. That is, it is well known that the signal output from a super-regenerative detector is considerably distorted, this distortion being of the even harmonic type. The audio amplifier 4, 9, 10 also produces a considerable amount of this same type of distortion. By properly polarizing the secondary winding of transformer 20 these two distortions may be made largely to cancel each other in the output of the receiver.

Condenser 43 is a radio frequency by-pass condenser for resistance 31 and is of about .006 microfarad whereas condenser 44 is an audio by-pass to this resistance and is of about one microfarad. This arrangement is necessary since by reason of the structure of this latter condenser it does not satisfactorily by-pass radio frequencies.

Condenser 34, which couples the output from oscillator 11, 14, 15 to the grid and anode of the detector is connected directly in shunt to the primary of the transformer 20. This condenser has low impedance to currents of the quench frequency but relatively high impedance to the audio frequencies to be detected. Thus only a small quench frequency voltage appears across the primary winding of this transformer. This, of course, tends to reduce the amount of quench frequency voltage which appears in the output. A further reduction in the transmission of quench frequency currents through the audio amplifiers is produced by electrostatic shield 42 placed between the windings of this transformer and grounded. Condensers 38 and 39 which are in shunt with the audio circuit serve further to reduce transmission of the quench frequency.

The potentiometer 23 serves as a manually volume control for the received signals and also in combination with condenser 38, which is of .001 microfarad, serves to effect bass tone compensation, that is, an increased attenuation of high frequency currents relative to low frequency currents upon reduction in the volume of signal transmitted through the system. Thus as the variable contact of the potentiometer 23 is moved to the right the audio volume is reduced, but since condenser 38 passes substantially only the high frequencies, the left-hand portion of the potentiometer and condenser 22 produce an increased drop in voltage at these frequencies thereby reducing the high frequency voltage applied to the grid of the amplifier 3 at a greater rate than the lower frequency voltage. An additional tone control is provided in the output circuit of the amplifier 3, this means comprising a condenser 39 and resistance 40 connected in series across the output circuit, the resistance 40 being variable to control the amount of high frequency currents by-passed through the condenser 39.

My invention is highly advantageous in other applications than those specifically mentioned herein. It may find particular utility, for example, in connection with television, or picture reception. It possesses the advantage of wide band reception and high gain in a single electron discharge device. Hissing sounds due to action within the discharge device are objectionable only at extremely low or zero input signal level. Of course, a quench frequency higher than any signal frequency to be received would be employed and a suitable form of coupling between the detector and the succeeding stage, or stages, may be employed which is capable of efficient transmission of the band of frequencies involved.

While I have shown a particular embodiment of my invention it will, of course, be understood that I am not limited thereto since many modifications both in the circuit arrangement and in the instrumentalities employed may be made. I contemplate by the appended claims to cover any such modifications as fall within the true spirit and scope of my invention.

What I claim as new and desire to secure by Letters Patent of the United States, is:

1. The method of operation of a super-regenerative detector, comprising an electron discharge device having an anode, a cathode and a grid, and connections from said cathode to said grid and anode respectively, which includes the steps of supplying oscillatory voltage from said anode connection to said grid connection to produce regeneration and maintain the magnitudes of the oscillatory voltages on said grid and anode at the frequency at which said detector is regenerative in a ratio such that the intensity of signal output from said detector is substantially constant irrespective of variations in intensity of signal supplied to said detector over the widest range of said variations.

2. The combination, in a super-regenerative detector, of an electron discharge device having an anode, a cathode, and a grid, an oscillating circuit connected between said anode and grid, and means to proportion the voltage of said oscillatory circuit which appears on said grid and anode to maintain the intensity of output from said detector substantially independent of the intensity of input to said detector over the broadest range of variation in intensity of said input said means comprising a connection between said cathode and a point on said oscillatory circuit.

3. The combination, in a super-regenerative detector, of an input circuit therefor, an output circuit, a three element electron discharge device, means whereby signals received in said input circuit are detected by said discharge device and supplied to said output circuit, means connecting said discharge device for super-regenerative operation over a wide frequency range in the short wave region of the frequency spectrum, means for applying oscillatory voltages of the frequency at which said device regenerates to said grid and anode with relative magnitudes to maintain the output from said detector substantially constant irrespective of the magnitude of input to said detector within a range extending from substantially one microvolt to 10,000 microvolts, and means for tuning said input circuit to a desired frequency in said range of frequencies.

4. The combination, in a super-regenerative detector, of an input circuit, an output circuit, a three element electron discharge device, means whereby signals received in said input circuit are detected by said discharge device and supplied to said output circuit, means connecting said discharge device for super-regenerative operation over a wide frequency range in the short wave region of the frequency spectrum, and means controlling said detector to maintain the output from said detector substantially constant irrespective of the magnitude of input to said detector within a range extending from substantially one microvolt to substantially 10,000 microvolts when said detector is adjusted for operation at any frequency in said range, said means comprising an oscillatory circuit including a single tuning condenser, and means for rendering the adjustment of said tuning condenser the sole adjustment necessary to produce said constant output at any frequency in said range.

5. The combination, in a super-regenerative detector, of an electron discharge device having an anode, a cathode and a grid, means connecting said discharge device for super-regenerative operation, said means comprising a continuous inductance having opposite terminals connected respectively to said anode and grid, and an intermediate point, a connection between said intermediate point and said cathode including a source of quench frequency electromotive force and an output device, the voltage of the frequency at which said device regenerates appearing between said grid and cathode and between said anode and cathode being dependent upon the position of said intermediate point and said point being so positioned that said voltages are proportioned relative to each other to produce uniform output over the broadest range of intensities of voltage applied to said super-regenerative detector and a tuning condenser connected across said inductance, said tuning condenser comprising the sole element to be adjusted to adapt said detector for operation at any frequency in a desired range.

6. The combination, in a super-regenerative detector, of an electron discharge device having an anode, a cathode and a grid, an oscillatory circuit connected between said gride and anode, a source of quench oscillations, means connecting said source of quench oscillations between said cathode and a point on said oscillatory circuit, input and output circuits for said detector, means dependent upon the location of said point on said oscillatory circuit for so proportioning the oscillatory potentials of said oscillatory circuit on said grid and anode that the intensity of oscillations in said output circuit is substantially constant over the widest range of variations of oscillations in said input circuit, the constancy of intensity of said output oscillations during variation of the intensity of oscillations in said input circuit over said widest range being materially reduced upon any appreciable movement of said point in either direction on said oscillatory circuit.

7. The combination, in a super-regenerative detector, of an electron discharge device having an anode, a cathode and a grid, an oscillatory circuit connected between said grid and anode, a source of quench oscillations, means connecting said source of quench oscillations between said cathode and a point on said oscillatory circuit, input and output circuits for said detector, means whereby the intensity of oscillations in said input circuit varies over a range extending from substantially one microvolt to substantially 10,000 microvolts, and means dependent upon the location of said point on said oscillatory circuit so to proportion the oscillatory voltage of said oscillatory circuit applied to said anode and grid that the intensity of oscillations in said output circuit varies to an extent not exceeding one decibel during said variation in input to said detector, the constancy of intensity of said oscillation in said output circuit during variation of the intensity of oscillations in said input circuit being materially reduced upon any appreciable movement of said point in either direction on said oscillatory circuit.

8. The combination, in a super-regenerative detector, of an electron discharge device having an anode, a cathode and a grid, an oscillatory circuit connected between said grid and anode, a source of quench oscillations, means connecting said source of quench oscillations between said cathode and a point on said oscillatory circuit, input and output circuits for said detector, means dependent upon the location of said point on said oscillatory circuit for so proportioning the oscillatory voltage of said oscillatory circuit applied to said grid and anode that the intensity of oscillations in said output circuit is substantially constant over the widest range of variations of said oscillations in said input circuit, the constancy of said oscillations in said output circuit during variation of the intensity of oscillations in said input circuit over said widest range being materially reduced upon any apreciable movement of said point in either direction on said oscillatory circuit, and means to tune said oscillatory circuit over a range of from 30 to 42 megacycles while the optimum constancy of output with respect to variation in input is substantially maintained.

9. The combination, in a super-regenerative detector, of an electron discharge device having an anode, a cathode and a grid, an oscillatory circuit connected between said grid and anode, a source of quench oscillations, means connecting said source of quench oscillations between said cathode and a point on said oscillatory circuit, input and output circuits for said detector, means whereby the intensity of oscillations in said input circuit varies over a range extending from substantially one microvolt to substantially 10,000 microvolts, means dependent upon the location of said point on said oscillatory circuit for so proportioning the oscillatory voltage of said oscillatory circuit applied to said grid and anode that the intensity of oscillations in said output circuit varies within a range not exceeding one decibel during said variation of said oscillations in said input circuit over said range, the constancy of said output oscillation during variation of the intensity of oscillations in said input circuit over said range being materially reduced upon any appreciable movement of said point in either direction on said oscillatory circuit, and means to tune said oscillatory circuit over a range of from 30 to 42 megacycles while said constancy of output with respect to variation in input is substantially maintained.

10. The combination, in a super-regenerative detector having an anode, a cathode and a grid, of an oscillatory circuit connected between said anode and grid, a condenser connected between said oscillatory circuit and grid, a resistance between said cathode and a point between said condenser and grid, and a source of quench frequency oscillations connected between said cathode and a point on said oscillatory circuit, the natural frequency of said oscillatory circuit being sufficiently high that said oscillatory circuit offers practically no impedance to said quench frequency oscillations whereby substantially the entire quench frequency voltage is effective on said anode, and the impedance of said resistance being sufficiently high relative to the impedance of said condenser that the greater portion of said quench frequency voltage is effective on said grid.

11. The combination, in a radio receiver, of a detector, means to supply signal modulated oscillations thereto, said detector producing harmonically distorted audio output signal currents, an audio amplifier having an audio input circuit and an audio output circuit, a coupling device arranged to supply the harmonically distorted audio output signal currents from said detector to said input circuit, said audio amplifier producing a harmonic distortion of audio frequency currents supplied thereto substantially to neutralize the distortion in said currents supplied from said detector and thereby faithfully to reproduce in said audio output circuits currents representing said signal.

12. The combination, in a super-regenerative detector, of an electron discharge device having an electron receiving electrode, an electron emitting electrode and a control electrode, a circuit between said control elctrode and electron emitting electrode, a circuit between said electron receiving and electron emitting electrodes, said last circuit including a load device, means coupling said circuit to produce regeneration at a desired frequency, means periodically to interrupt said regeneration, means to apply radio frequency signals to said detector, and means to maintain the voltage at said desired frequency between said electron emitting electrode and control electrode in a ratio to that between said electron emitting electrode and electron receiving electrode such that the intensity of signal output supplied to said load device is substantially constant irrespective of variations in intensity of signal supplied to said detector over the widest range of said variations.

13. The combination, in a super-regenerative detector, of an electron discharge device having an anode, a cathode, and a grid, an oscillatory circuit connected between said anode and grid, an intermediate point thereon being connected to said cathode, whereby regeneration occurs at the frequency at which said circuit is oscillatory, input and output circuits connected to said discharge device and means external of said discharge device to maintain the magnitude of oscillatory voltage on said grid in such a ratio to that on said anode that a constant magnitude of output current is supplied to said output circuit during the widest variations in voltage supplied to said input circuit.

14. The combination in a super-regenerative detector of an input circuit, an output circuit, a three-element electron discharge device, means whereby signals received in said input circuit are detected by said discharge device and supplied to said output circuit, means connecting said discharge device for super-regenerative operation over a wide frequency range in the short wave region of the frequency spectrum, means comprising an oscillatory circuit including a variable condenser coupling the input and output electrodes of said electron discharge device and adapted to tune said detector to any frequency within said range, and means interconnecting said first-named means to said second-named means whereby to control the operation of said detector such as to maintain a substantially constant rectified potential across said output circuit for all magnitudes of signal input potentials impressed upon said input circuit within a predetermined range below 10,000 microvolts.

GEORGE W. FYLER.